Figure 4:
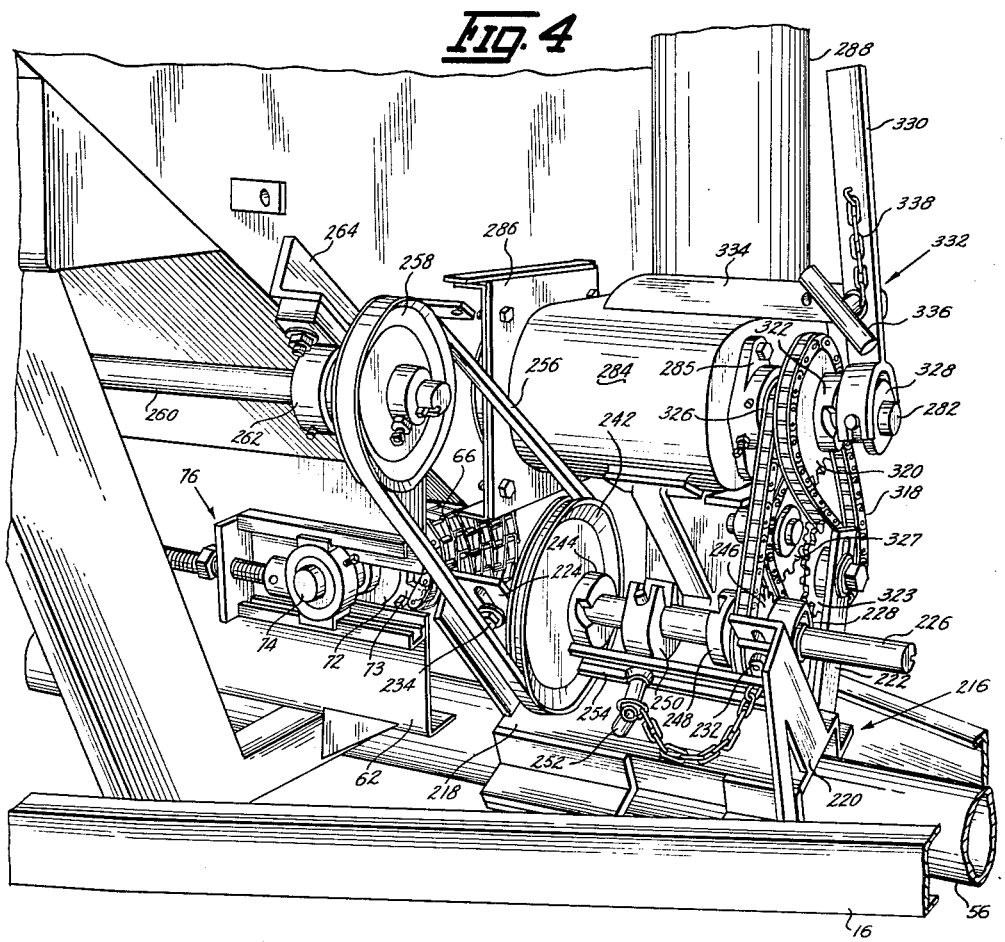

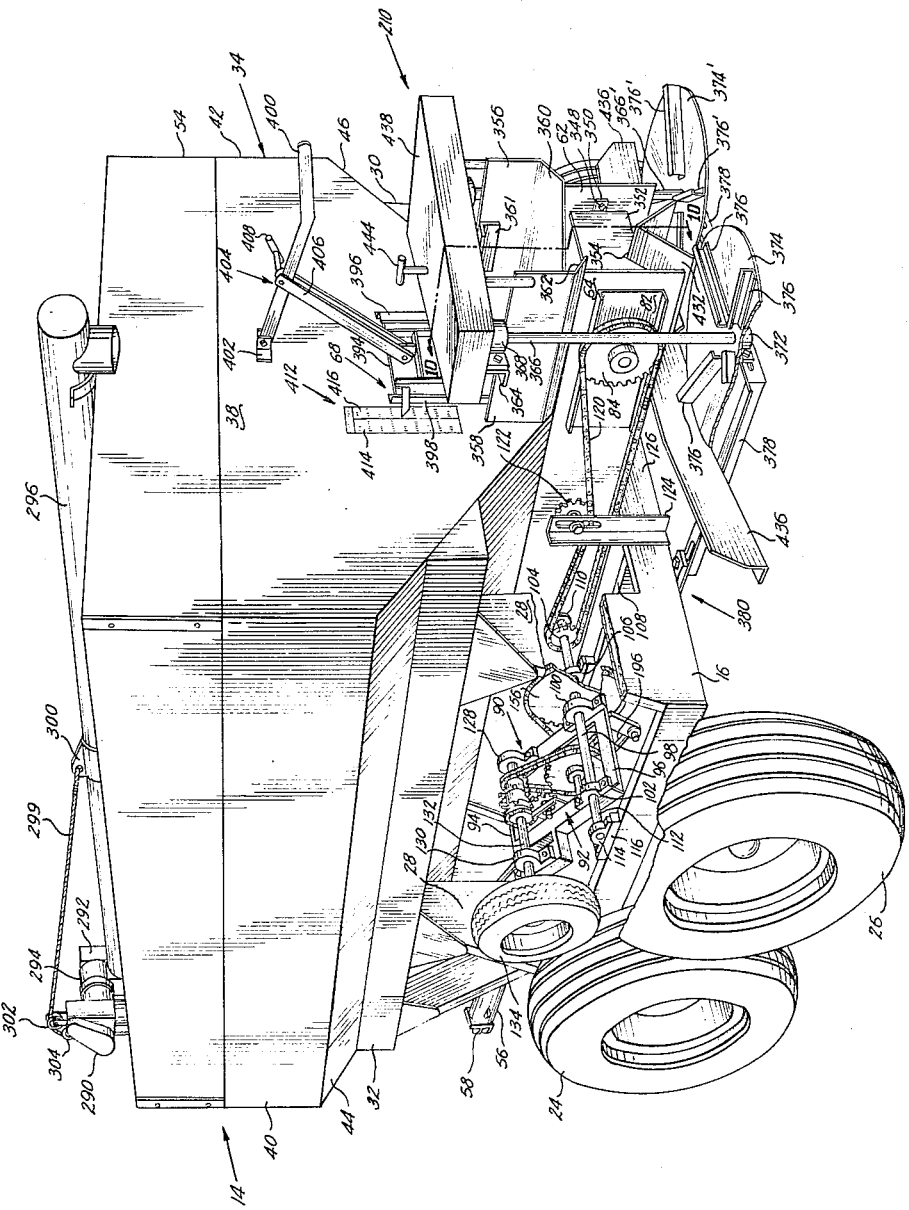

Nov. 30, 1965　　　F. A. KAVAN ETAL　　　3,220,740
MATERIAL SPREADING AND HANDLING TRAILER
Filed Dec. 4, 1963　　　　　　　　　　　　　7 Sheets-Sheet 2
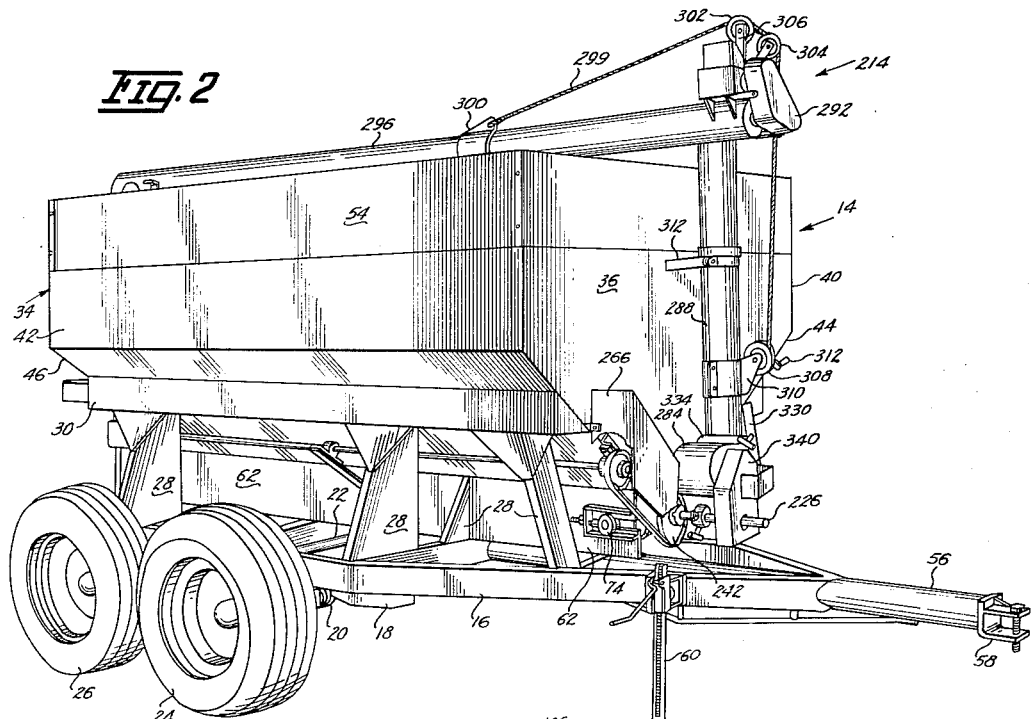
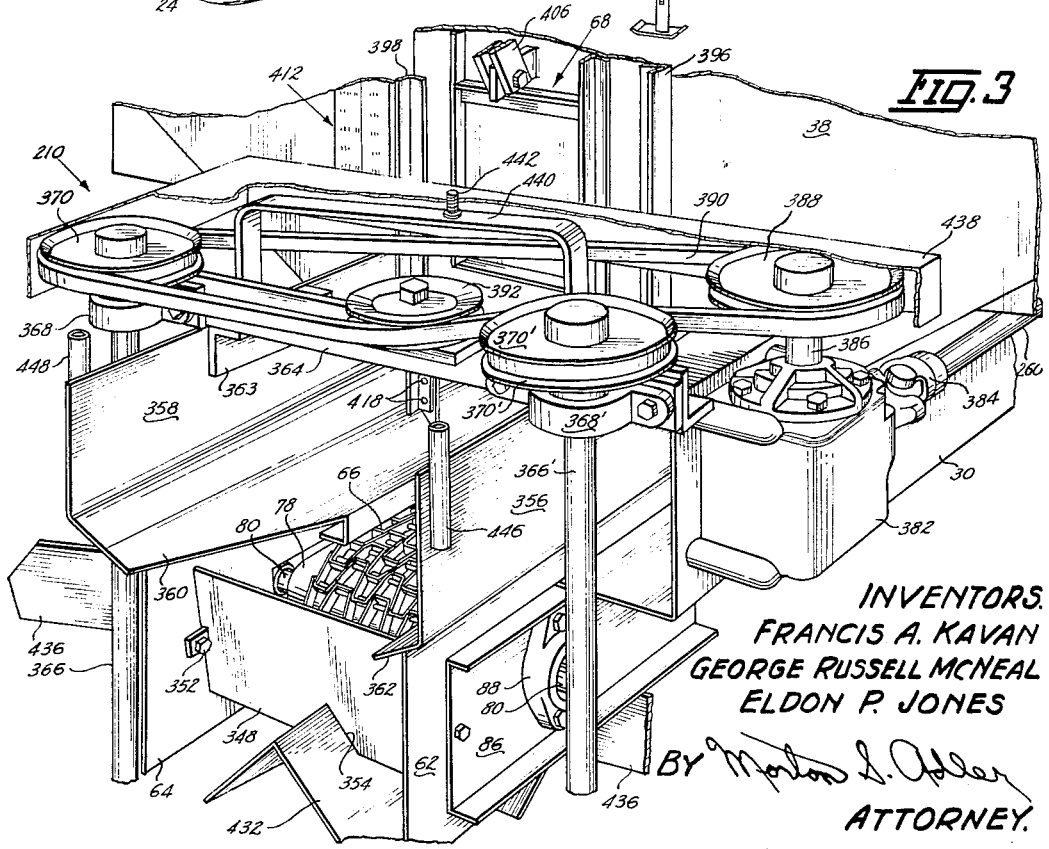
INVENTORS.
FRANCIS A. KAVAN
GEORGE RUSSELL MCNEAL
ELDON P. JONES
BY Morton S. Adler
ATTORNEY.

INVENTORS.
FRANCIS A. KAVAN
GEORGE RUSSELL MCNEAL
ELDON P. JONES

ATTORNEY.

Nov. 30, 1965    F. A. KAVAN ETAL    3,220,740
MATERIAL SPREADING AND HANDLING TRAILER
Filed Dec. 4, 1963    7 Sheets-Sheet 4
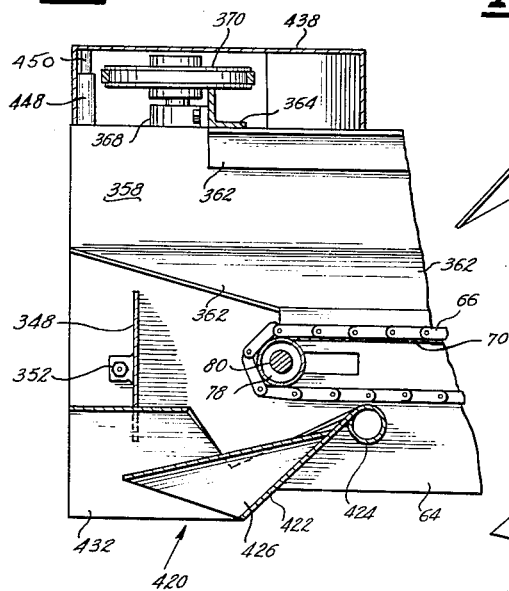
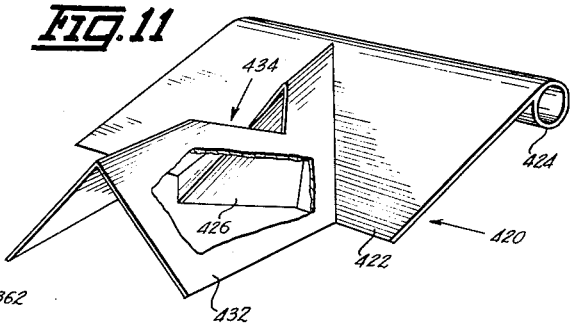
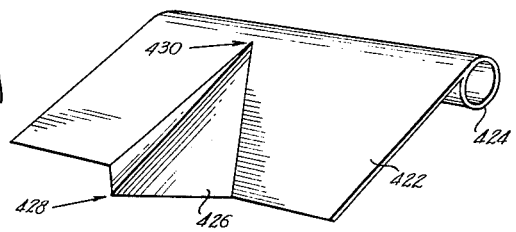
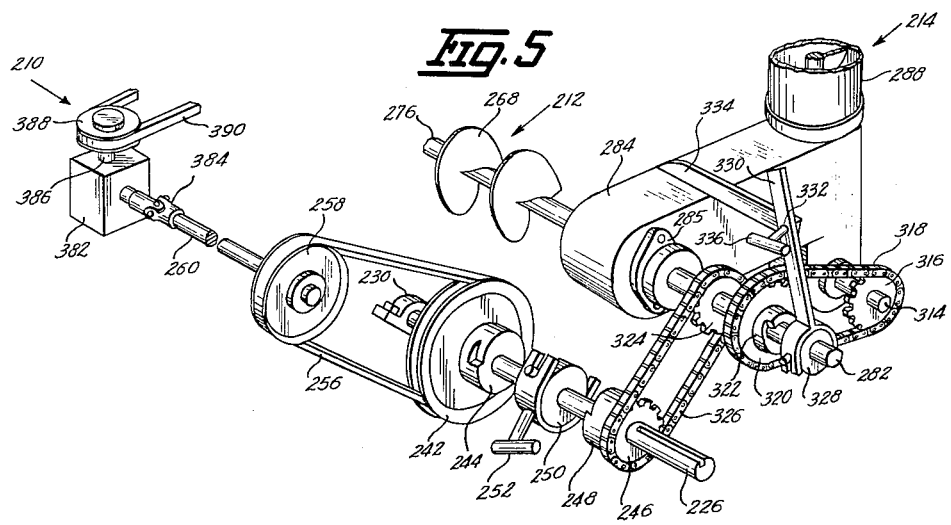
INVENTORS.
FRANCIS A. KAVAN
GEORGE RUSSELL McNEAL
ELDON P. JONES
BY
ATTORNEY.

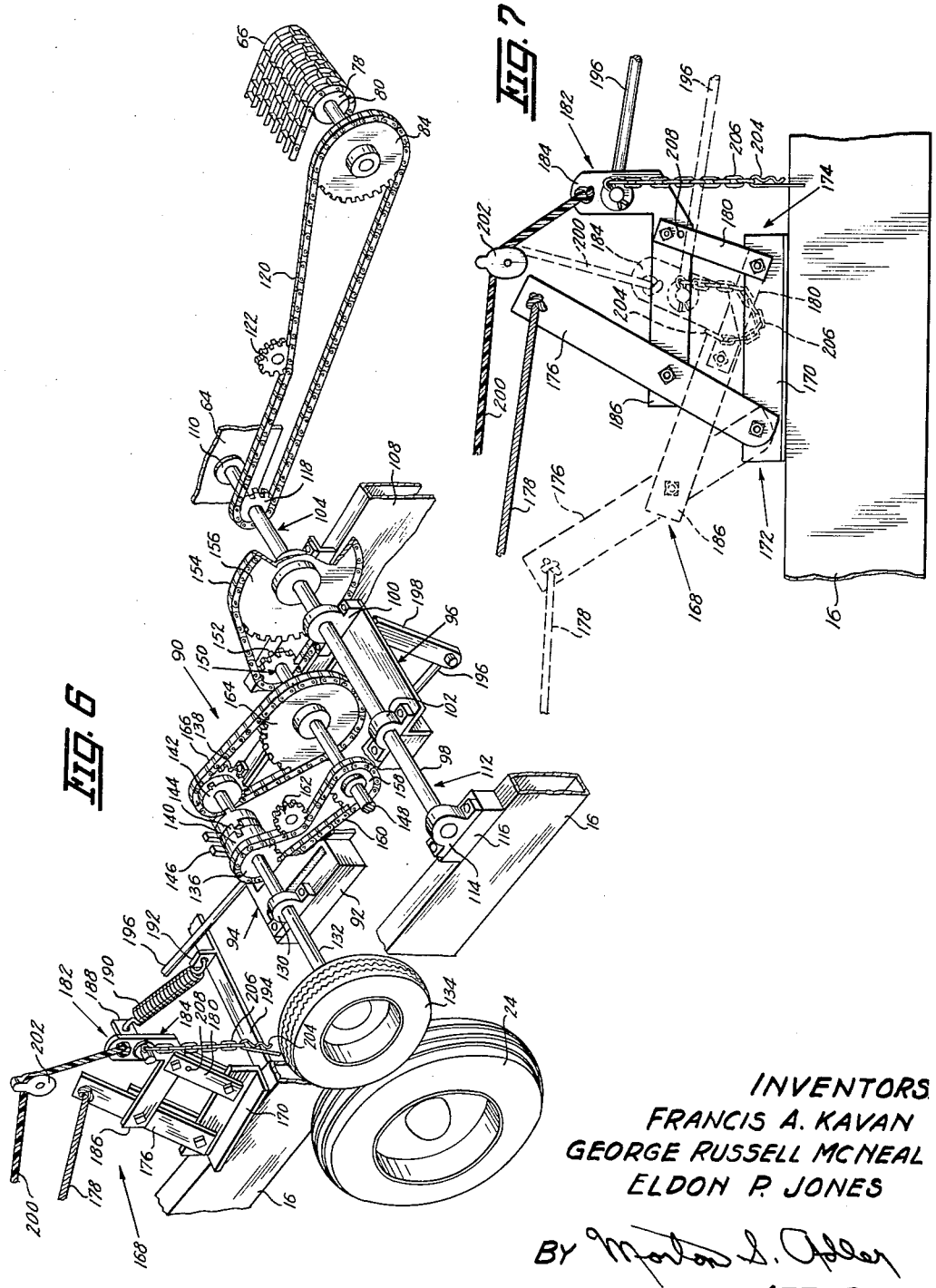

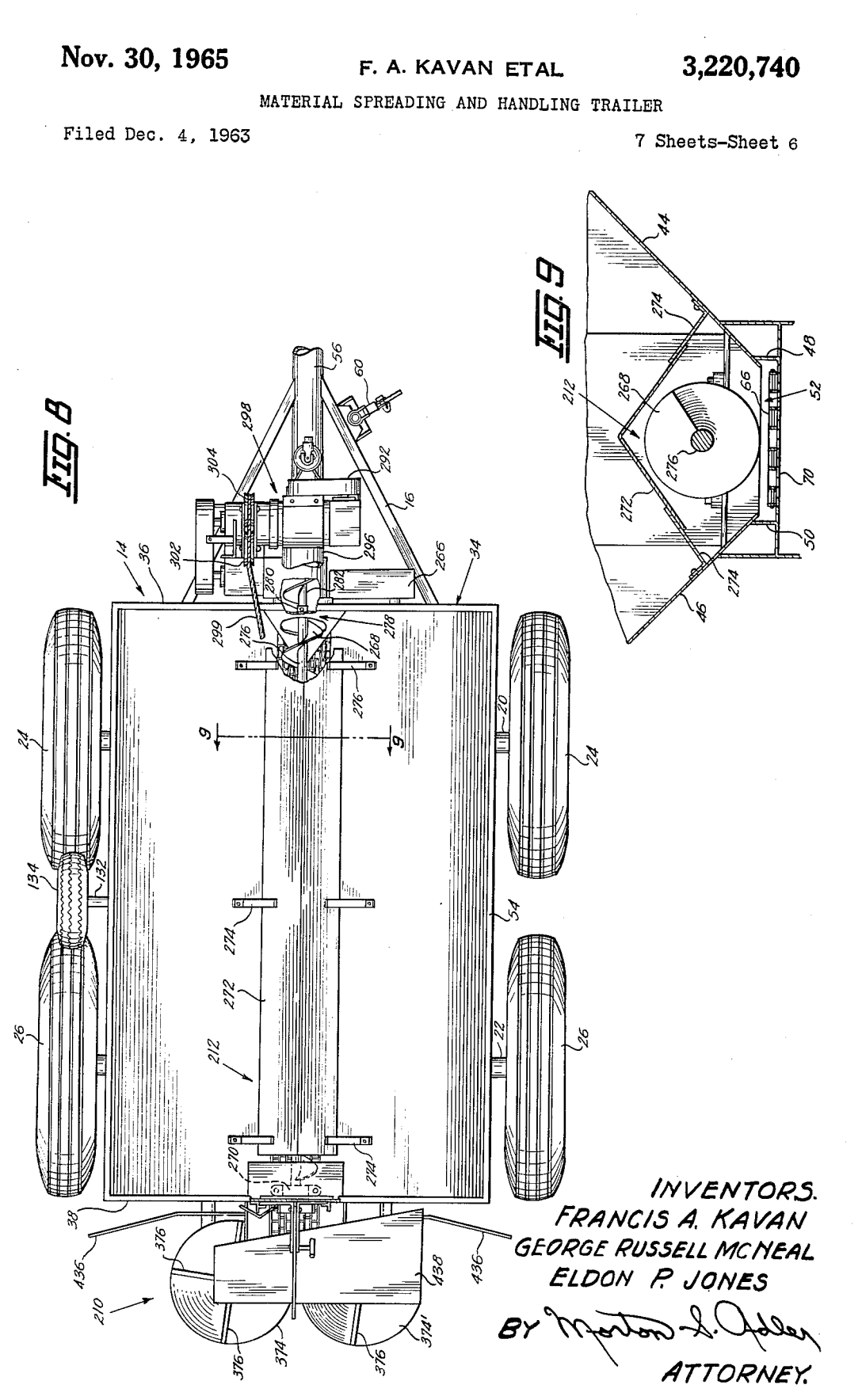

Nov. 30, 1965　　　F. A. KAVAN ETAL　　　3,220,740
MATERIAL SPREADING AND HANDLING TRAILER
Filed Dec. 4, 1963　　　　　　　　　　　　　　7 Sheets-Sheet 7

INVENTORS.
FRANCIS A. KAVAN
GEORGE RUSSELL MCNEAL
ELDON P. JONES

ATTORNEY.

3,220,740
MATERIAL SPREADING AND HANDLING
TRAILER
Francis A. Kavan, George Russell McNeal, and Eldon P.
Jones, all of Lenox, Iowa, assignors, by mesne assignments, to Hoover Ball and Bearing Company, Ann Arbor, Mich., a corporation of Michigan
Filed Dec. 4, 1963, Ser. No. 327,994
20 Claims. (Cl. 275—6)

Our invention relates to improvements in a material handling pull type trailer which we have designated as a multi-purpose vehicle because of its adaptability for use in a variety of situations.

More particularly this trailer has been designed for use as a spreader for bulk fertilizer although it may also be used for spreading other materials; for mixing and blending fertilizer or other materials; for broadcast sowing of oats, and as a supply source for transferring materials to other vehicles such as a corn planter or to a place of deposit.

The application of fertilizer to agricultural lands is accomplished in different ways such as by liquid spraying and the spreading of a bulk fertilizer composition. With the latter method, which is in widespread use, and with which this invention is concerned, it has been common to employ the use of truck mounted spreading equipment but because of the large capital investment required and many other obvious disadvantages with the use of such equipment in the fields during wet seasons, there is a present trend toward a pull type trailer or wagon which has many advantages over the truck type. Amongst such advantages is the fact that the pull type trailer is not as heavy nor as unwieldy as the truck type, is easier to handle and more efficient in the field during wet seasons, is considerably less expensive and can generally be moved or transported quicker and more economically.

Accordingly, the principal aim of this invention is the provision of a substantially improved, more efficient and more versatile trailer or wagon type vehicle of the above class than those of a similar type which have been recently introduced.

Among several important objects to this end, it is sought to provide a material handling trailer or wagon which is characterized by:

An improved design in a twin spinner assembly at the rear to develop a high uniform spread pattern at either a high or low output of material, Novel baffle means associated with the spinner assembly to prevent fertilizer from being thrown into the trailer wheels and to distribute the fertilizer both to the periphery and axial portion of the spinner disks, An improved two speed ground driven conveyor for delivering material to the spinner assembly, A manual control means operable from a tractor seat to which this wagon may be attached, and connected to the ground driven conveyor, Lock means for the conveyor in non-operating position for safety in road travel, A calibrated sliding door at the rear for selectively controlling the flow rate of material from the wagon body on the conveyor to the spinner assembly in relation to the ground speed of the vehicle, A spinner assembly which is so designed and constructed as to be easily and completely removable from the wagon chassis, A detachable auger type boom assembly for removing material in the wagon to a point of deposit. Such assembly includes a vertical section operatively connected to an auger within the wagon, and a generally horizontal section operatively connected to the top of the vertical section and capable of swinging in a 360° arc as well as being raised and lowered relative to a horizontal plane.

A new and novel clutching assembly connecting the wagon auger to the boom auger whereby the boom auger can be operated independently of the wagon auger and thereby permits the boom to be cleared of material at the end of any given operation. This eliminates the packing of material in the vertical section of the boom and the consequent jamming of the auger and gearing which is a frequent source of trouble with present boom structures of this type that are driven only simultaneously with the wagon auger, and The adaptation of the clutching assembly referred to in the preceding paragraph to effect the operation of the spinner assembly.

Further objects and the more obvious advantages of the invention will be mentioned or else appear plainly from the description which follows.

Figure 13:
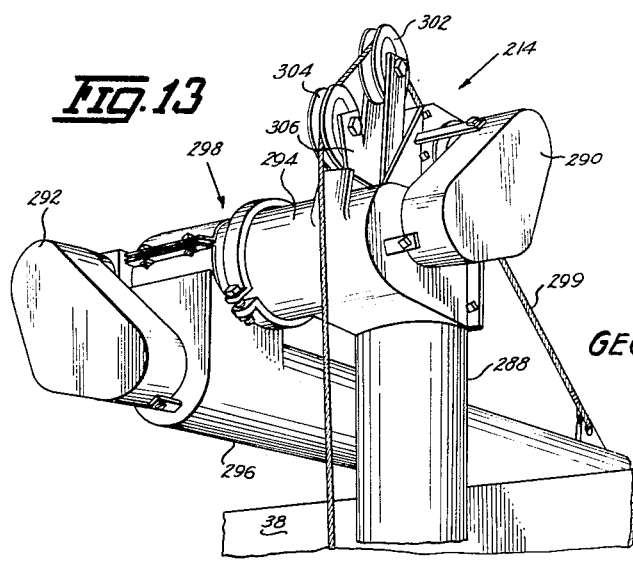
Figure 14:
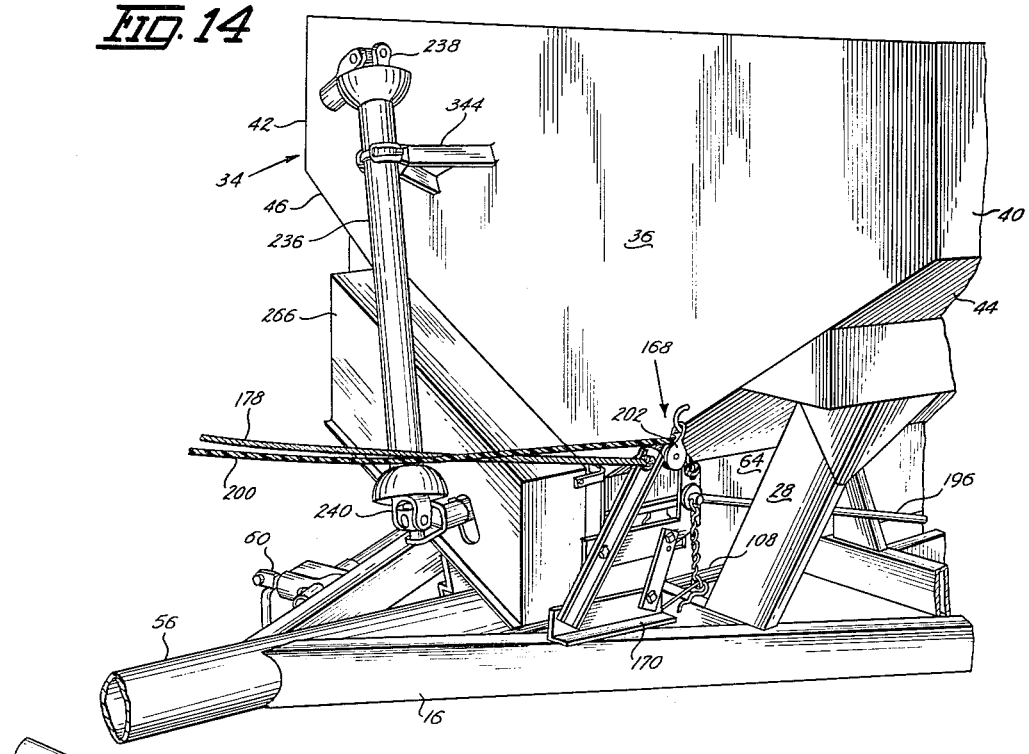
Figure 15:
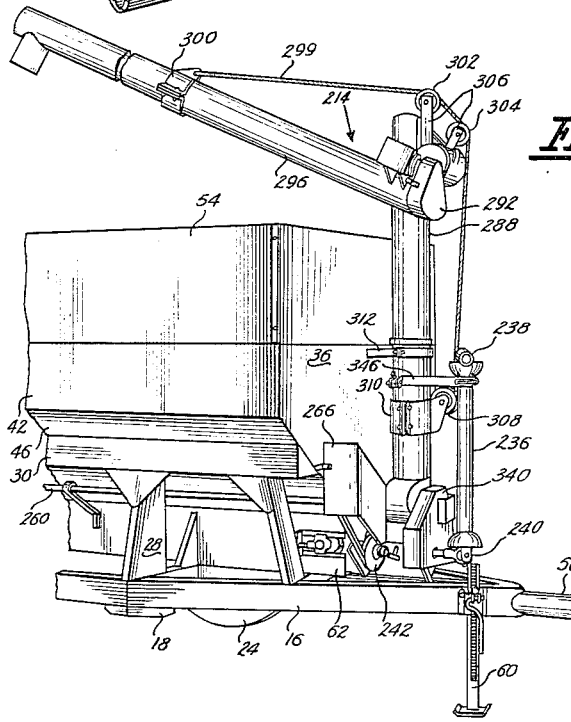

This invention consists of novel parts and combination of parts to be hereinafter described whereby the objects set forth are attained, as pointed out in the claims, and illustrated in the accompanying drawings, in which:

FIG. 1 is a perspective rear view showing a preferred embodiment of this invention, FIG. 2 is a perspective front view thereof, FIG. 3 is an enlarged fragmentary perspective view illustrating certain details of the spinner assembly at the rear of this wagon, FIG. 4 is an enlarged fragmentary perspective view illustrating certain details of the clutching and drive means at the front of this wagon, FIG. 5 is a view similar to FIG. 4 but excluding all wagon structure and showing the clutching and drive mechanism more particularly in relation to the spinner assembly, the wagon auger and the boom auger, FIG. 6 is an enlarged exploded perspective view of the gear train relative to the ground driven conveyor and including details of the two speed control mechanism therefor and the control means, operable from a tractor seat, for actuating and deactuating the drive connection to the wagon ground wheels, FIG. 7 is an enlarged elevational view of the manually operable control unit which regulates the driving or non-driving position of the drive wheel for the conveyor and with the solid lines indicating the drive position and the broken lines indicating the non-driving or locked position, FIG. 8 is a top plan view of this new wagon, FIG. 9 is a cross-sectional view taken on the line 9—9 of FIG. 8, FIG. 10 is a longitudinal section view taken on the line 10—10 of FIG. 1, FIG. 11 is an enlarged perspective view of the novel deflector used with the spinner assembly on this wagon and with portions cut away to more fully illustrate the construction thereof, FIG. 12 is an enlarged perspective view of the deflector in FIG. 11 with the cut away portion in FIG. 11 completely removed, FIG. 13 is an enlarged perspective view of the pivotal end assembly of the boom unit, FIG. 14 is a fragmentary perspective view of the front portion of this trailer without a boom unit and also showing the position of the driving wheel control unit when such wheel is in operable position, and FIG. 15 is a fragmentary perspective view of the front of this trailer showing the boom unit mounted thereto.

Referring to the drawings, our new pull type trailer or wagon is designated generally by the numeral 14 and includes a sturdy frame 16 of unitized welded steel construction with welded corner gussets 18 for extra strength. Frame 16 carries a pair of torsion-spring axle units 20 and 22 (FIG. 8) to which there is mounted the respective ground engaging tired wheels 24 and 26 arranged in tandem on each trailer side as shown. Upstanding steel support members 28 on frame 16 support the beams 30 and 32 to which a wagon box or body 34 is mounted. Box 34 includes a vertical front wall 36, a vertical rear wall 38, vertical upper side walls 40 and 42, converging bin walls 44 and 46 and lower spaced vertical side walls 48 and 50 (FIG. 9) which define a trough or channel 52 for purposes to be later described. Box 34 as described is designed to hold 2.8 tons of material and such capacity may be increased to four tons by use of the upper sideboard attachment extension 54. The forward end of frame 16 is provided with a suitable tongue extension 56 having a clevis pin means 58 for attachment to a tractor or the like (not shown) in a well-known manner, and to one side of the forward portion of frame 16 there is mounted a heavy duty swing-up jack unit 60 for use at times as shown in FIG. 2.

The area below trough 52 is boxed in at the sides by the spaced parallel horizontal panels 62 and 64 which extend longitudinally of trough 52 from the front wagon wall 36 so as to project rearwardly beyond the rear wall 38 as shown in FIGS. 1 and 3. An endless conveyor belt 66 of mesh or grid-like construction, which is used for moving material through an opening 68 in the rear wall 38 of box 34 as will later appear, moves longitudinally over floor 70 of trough 52 and between panels 62 and 64, it being noted that floor 70 extends beneath opening 68 into the rearward projecting portions of such panels although not to the rear extremities thereof. The forward end of conveyor 66 (FIG. 4) is trained over an idler roller 72 which is provided with teeth 73 to keep it from crawling and which is carried by a bearing mounted shaft 74 supported in an adjustable bracket assembly 76 secured to the outer side of panel 62, and the rearward end of conveyor 66 is trained over a driven roller 78 (FIG. 6) carried on shaft 80 which extends at one end through the rearward projecting portion of panel 64 and a reinforcing plate 82 thereon (FIG. 1) where it carries a bearing mounted sprocket wheel 84, and extends at the opposite end through panel 62 and the reinforcing plate 86 thereon (FIG. 3) to the bearing member 88.

*Conveyor drive and control mechanism*

Reference is now made to FIGS. 1, 6 and 7 for a description of the drive and control mechanism for conveyor 66 and which is located on the left side of this wagon relative to its direction of forward travel and approximately opposite a point on frame 16 intermediate wheels 24 and 26. Such mechanism includes a quick speed reduction assembly designated generally by the numeral 90 which is constructed as follows. A vertically swingable frame 92, having front and rear portions 94 and 96 respectively, carries a shaft 98 across portion 96 which is rotatably journalled in bearings 100 and 102 as shown. The inner end 104 of shaft 98 extends through a bearing 106 mounted on a stringer 108 of frame 16 and is rotatably journalled in bearing 110 that is mounted to panel 64. The outer end 112 of shaft 98 extends to and is rotatably mounted in bearing 114 attached to a block 116 which is mounted to frame 16. It will thus be appreciated that shaft 98 serves as a pivot means permitting frame 92 to be vertically raised and lowered. A sprocket wheel 118 is mounted to end portion 104 of shaft 98 and an endless roller chain 120 connects sprockets 118 and 84. An idler sprocket 122 engages chain 120 intermediate sprockets 118 and 84 and is vertically adjustable in bracket 124 (FIG. 1) attached to the rear cross beam 126 of frame 16. A two speed control means for wheel 118 to regulate the speed of conveyor 66 is one of the important features in this invention and is provided by assembly 90 as follows. A pair of spaced bearing members 128 and 130 supports the rotatable shaft 132 which projects laterally from bearing 130 and has the small tired drive wheel 134 suitably mounted on the shaft end in such a position as to be capable at times of peripheral engagement with the ground wheel 24 as will later be referred to in more detail. A pair of spaced sprocket wheels 136 and 138 are free running on shaft 132 and each such sprocket is provided with the respective opposed keyed collar member 140 and 142 as seen in FIG. 6. Intermediate collars 140 and 142 and slidably keyed onto shaft 132 is a clutch member 144 which includes a lever type handle 146 that depends below frame portion 94 and is easily accessible for manually engaging either sprocket 136 or 138 as desired for operation by the drive wheel 134. A shaft 148 is disposed in parallel relationship to shafts 132 and 98 and as seen in FIG. 6 where portions of frame 92 are removed, it will be understood that shaft 148 is mounted in suitable bearings which are attached to the underside of respective opposite frame 92 sections which have been thus broken away. The inner end of shaft 148 indicated at 150 carries a sprocket wheel 152 connected by an endless roller chain 154 to a larger diameter sprocket wheel 156 on shaft 98 intermediate bearing 100 and wheel 118. On the opposite end portion of shaft 148 is the sprocket 158 having a 1—1 ratio with sprocket 136 and connected thereto by the roller chain 160. An idler wheel 162 in engagement with chain 160 is carried by a suitable bracket which is not shown in FIG. 6 but which is attached to portions of frame 92 that have been cut away. Also on shaft 148, intermediate sprockets 152 and 158, is the large sprocket 164 that is connected by the roller chain 166 to sprocket 138 to provide a speed reduction relative to the drive speed from sprocket 136. From the foregoing description it will be seen that conveyor 66 may be driven at a relatively fast or slow speed by the simple and quick connection of clutch 144 to either sprocket 136 or 138. It will also be appreciated that the change of size of sprocket 84, for example, or other relative changes in sprocket sizes of assembly 90 may be effected to obtain desired differential in the two speed clutching assembly.

The movement of frame 92 so as to place the drive wheel 134 into and out of driving engagement with the ground wheel 24 is accomplished by what we call the finger tip on-off control unit 168 (FIGS. 6 and 7) because of its simple, easy and quick operation from the seat of a tractor or the like to which a trailer of the type here described will be attached for normal field use. Unit 168 is located forwardly of frame 92 and comprises an angle support bracket 170 suitably secured to the forward portion of the main trailer frame 16 so as to extend longitudinally thereon, and for purposes of description has the respective forward and rear ends 172 and 174. An elongated rigid upstanding lever or link 176 is pivotally secured at its lower end to end 172 of bracket 170 and a pull cord 178 connects to the upper end of lever 176 and extends to the seat of a tractor (not shown). A second rigid upstanding lever or link 180, shorter in length than lever 176, is pivotally secured at its lower end to the rear 174 of bracket 170 in longitudinal alignment with lever 176. A bell crank 182 having the integral vertical arm 184 and horizontal arm 186 has the outer end portion of arm 186 pivotally connected to lever 176 intermediate its ends and near the central portion thereof, and has the inner end portion of arm 186 similarly connected to the upper end of link 180. Arm 184 has an apertured ear 188 (FIG. 6) to which one end of a tension spring 190 is secured, the other end of said spring being attached to the ear 192 on a cross brace 194 on frame 16 rearwardly of bracket 170. A connecting rod 196 pivotally connects at one end to arm 184 of the bell crank 182 and, passing beneath frame 92, pivotally connects at the other end to the lower end of a depending lever 198 which is rigidly secured to the rear end 96 of frame 92. A second cord 200, also extendable to the tractor seat (not shown), is reeved over a pulley 202 on the front wall 36 of wagon 34 (FIG. 14) and connected to the upper end of bell crank arm 184. With control unit 168 thus constructed, it will be understood that the forward ends of the two cords 178 and 200 may be conveniently available to the operator seated on a tractor and as appears in FIG. 7 it will be noted that cord 200 is distinguishable in appearance from cord 178 for easy identification. In actual use this is accomplished by having the two cords made in contrasting colors. To place the drive wheel 134 into driving engagement with the ground wheel 24, the operator will pull on cord 200 to move unit 168 to the solid line position shown in FIGS. 6 and 7. This rocks the bell crank 182 so that rod 196 is pushed rearward so as to rotate frame 92 forwardly and downwardly until wheel 134 contacts wheel 24. As this occurs, the force of spring 190 prevents unit 168 from being accidentally moved so that wheel 134 is effectively locked in driving position and conveyor 66 will accordingly operate at the selected speed. To disengage the conveyor 66 and place the drive wheel 134 in unlocked position, the operator pulls on cord 178 which moves unit 168 to the broken line position shown in FIG. 7. This causes rod 196 to move forwardly to rotate frame 92 upwardly and away from wheel 24 as will be apparent. The linkage in unit 168 operates as a toggle joint and with link 180 in its over center position relative to bell crank arm 186 as seen in the broken lines of FIG. 7, spring 190, because of the lowered position of ear 188 (FIG. 6) acts to hold unit 168 in this unlocked position. Such position is used for over-the-road travel of this trailer and as an added precaution and safety measure to assure its remaining in unlocked position during such travel or otherwise when conveyor 66 is not in use, we have provided a safety pin 204 secured to arm 184 of the bell crank 182 by a chain 206 and which is removably insertable through link 180 and crank arm 186. For this purpose, hole 208 is provided in link 180 and a registering hole (not shown) is in arm portion 186. It will thus be appreciated that by virtue of the construction and operation of unit 168, an operator can place drive wheel 134 either into or out of gear without dismounting from the tractor seat, without having to even look back and without having to stop the tractor and trailer if it is in motion.

*Driving and clutching mechanism for augers and spinner assembly*

The conveyor 66 described above is designed to deliver material out of the rear opening 68 in wagon 34 to a spinner and distributing assembly 210 which will later be described in detail, and as an additional feature of this wagon we have also provided a screw auger means 212 within box 34 for moving material toward the front of the wagon for distribution through a screw auger boom unit 214. Since the auger units 212 and 214 and the spinner assembly 210 are both powered from the same source, the drive mechanism therefor will be first described and for this purpose, reference is made particularly to FIGS. 4 and 5.

At the forward end of box 34 an elongated supporting frame 216 comprises a base 218 which is secured astraddle the rearward portion of tongue 56, two upstanding diverging slotted arms or brackets 220 and 222 at the forward end of base 218 and a similar arm 224 at the rear opposite to arm 220. A drive shaft 226 is rotatably supported in the spaced bearings 228 (FIG. 4) and 230 (FIG. 5) which in turn are adjustably mounted to the respective arms 220 and 224 of frame 216 by means of the nut and bolt units 232 and 234 so that shaft 226 projects forwardly between arms 220, 222 as best seen in FIG. 4. Such projecting end of shaft 226 is designed for connection to the power take-off of a tractor (not shown) by a power take-off shaft 236 (FIGS. 14 and 15) which is provided on respective ends with the universal joints 238 and 240 in a well-known manner. Intermediate arms 224 and 220 and adjacent arm 224, shaft 226 carries a free running pulley wheel 242 which includes the keyed collar 244. Also free running on shaft 226 adjacent the inner side of arm 220 is the sprocket wheel 246 having the keyed collar 248. Intermediate pulley 242 and sprocket 246 a clutch assembly 250 is keyed to shaft 226 and may be manually slid longitudinally of shaft 226 to respectively engage either of the collars 244 and 248 and for this purpose clutch 250 includes a handle means 252 which is slidable in and tightenable in a bracket 254 securely affixed to arm 220 (FIG. 4). Thus far described it will be understood that pulley 242 and sprocket 246 cannot be simultaneously engaged with shaft 226 but they can be simultaneously disengaged therefrom. Pulley 242 connects by a belt drive 256 to pulley wheel 258 (FIG. 5) which is secured to a shaft 260 that extends longitudinally of the trailer above panel 62 (FIG. 2) for connection to the spinner assembly 210 as will be later described in detail. Shaft 260 is supported at its forward end in a bearing 262 that is movably mounted, for adjustment of belt 256 in a well-known manner, in a bracket 264 secured on wall 36 of box 34. A removable or hood cover 266 enclosing pulleys 242 and 258 and belt 256 is suitably attached to wall 36 (FIG. 15).

The sprocket wheel 246 on shaft 226 is designed to drive the augers within the auger and boom assemblies 212 and 214 and the structure to be described here includes one of the important and novel aspects of this invention inasmuch as it not only permits auger 212 and boom 214 to be operated simultaneously, as is customary, but also affords means for operating the auger unit within boom 214 independently of the wagon auger 212. With reference now to FIGS. 8 and 9, assembly 212 comprises a screw auger 268 within box 34 and extending between walls 36 and 38 in closely spaced relationship over conveyor 66 and supported at respective ends in suitable bearings of which only the rear bearing 270 is indicated. An inverted V-shaped hood 272 is supported over auger 268 by a plurality of braces 274. Auger 268 is designed to move material toward the front of box 34 and while normally the shaft 276 of auger 268 is continuous with the lower auger section of booms on vehicles of this type heretofore made so they must of necessity run simultaneously, it will be noted that shaft 276 terminates at its forward end 278 where it is removably connected by pin means 280 to the auger shaft 282 with the housing 284 which extends therethrough, being supported in bearing 285, and forwardly as seen in FIGS. 4 and 5.

Before describing the novel drive connections between shafts 226 and 282, reference is made to the boom unit 214 as indicated generally in FIGS. 13 and 15. No invention is claimed in the details of the screw auger operation for this boom and thus they are not shown in detail. It is pointed out, however, that housing 284 is removably mounted to wall 36 by means of bolting plate 286 (FIG. 4) thereto so that the entire assembly 214 is easily removable by releasing plate 286 and disconnecting shaft 282 from shaft 276. It will be understood that housing 284 contains at each end a conventional gear box for changing the direction of material flow from auger 212 through housing 284 and to the vertical stack 288 of unit 214, and that similar gear boxes are within the housings 290 and 292 for moving the material from stack 288 through the swivel mount 294 and into the dispensing stack 296. Mount 294 on stack 288 permits a 360° range of movement for stack 296 and the pivotal connection of stack 296 to mount 294 as at 298 permits stack 296 to be elevated and lowered. This is accomplished by a cord or rope 299 connected to a clamp 300 on stack 296 (FIG. 15) and reeved over a pair of pulleys 302 and 304 on a bracket 306 secured to mount 294 and extending downwardly therefrom to a manually operable ratchet wheel 308 attached to bracket 310 on stack 288. A strap brace 312 connects stack 288 to wall 36 for obvious purposes of support. It will be understood that a screw type auger mechanism is contained within stacks 288 and 296 and intermediate the same by conventional structures so that material can be moved therethrough from the interior of box 34 in a well-known manner.

The augers in the boom unit 214 are driven from shaft 314 which is a part of the conventional assembly at the bottom of stack 288 and which projects therefrom as best seen in FIG. 5. A sprocket wheel 316 secured to such projecting end of shaft 314 is connected by the chain drive 318 to a larger sprocket wheel 320 which is free running on shaft 282 and which includes the keyed collar 322. An idler sprocket 323 in engagement with chain 320 is adjustably mounted on arm 222 of frame 216. Welded to sprocket 320 so as to rotate therewith is a smaller sprocket 324 which is likewise free running on shaft 282. Sprocket 324 connects by chain drive 326 to sprocket 246 on shaft 226, and an idler sprocket 327 suitably mounted to housing 234 engages chain 326. It will thus be appreciated that as so far described, engagement of clutch 250 with collar 248 on sprocket 246 will drive shaft 314 through the gear train described so as to operate the augers in boom unit 214. However, since sprockets 320 and 324 are both free running on shaft 282, such shaft is not turned at this point so that auger 212 is inoperative. The reason for the different size of sprockets 324 and 320 is to operate the boom augers at preferably twice the speed of the horizontal or wagon box auger assembly 212. However, this speed ratio may of course be varied.

For operating shaft 276 of auger unit 212, a clutch means 328 (FIGS. 4 and 5) is keyed to the projecting end of shaft 282 and includes the upstanding hand lever 330 which is pivotally attached near but not at its upper end as at 332 to a brace 334 that is secured to housing 284. Lever 330 can thus be rocked on its pivot point 332 to selectively place clutch 328 into and out of engagement with collar 322 on sprocket 320. A tightening handle member 336, secured to lever 330 by chain 338, is adapted for threadable engagement through pivot point 332 to lock clutch 328 against accidental movement on shaft 282. It will thus be apparent from the foregoing that the boom unit 214 operates whenever sprocket 246 is engaged by clutch 250 but that the horizontal auger 212 only operates with the boom unit when sprocket 320 is engaged by clutch 328. Accordingly, when material is unloaded from box 34 by the auger units, unit 212 can be disengaged to permit unit 214 to continue in operation and thus clear all material out of stacks 288 and 296. This has the decided advantage of leaving stack 288 particularly free of material and thus prevent the packing of such material therein and consequent jamming of the gearing as so frequently occurs in present wagons having auger means for unloading. The chain driving mechanism for boom unit 214 is provided with a suitable removable hood or cover 340 as shown in FIGS. 2 and 15 and if a boom unit 214 is not used with this wagon, a cover or hood 266 as shown in FIG. 14 is used. Likewise, in FIG. 14 it will be noted that the power take-off shaft 236 is secured to a bracket 344 on wall 36 when not in use and when the boom unit attachment 214 is not used, and when unit 214 is used, the shaft 236 in inoperable position is secured by a bracket 346 mounted to stack 288 as seen in FIG. 15.

*Spinner and distributing assembly*

Referring now more particularly to FIGS. 1 and 3, the spinner and distributing assembly 210 is mounted exteriorly of the rear wall 38 of box 34. At this point, the rearwardly projecting portions of panels 62 and 64 are in spaced parallel relationship corresponding approximately to the width of opening 68 and the upper edges of such panels are on a plane with floor 70 as may be seen in FIG. 10 and intermediate the outer end portions of such panels is the end plate 348 secured as at 350 and 352. The lower central edge portion is provided with an inverted V notch 354 which will be later referred to. Attached to upper edge portions of each panel 62 and 64 are the respective sideboards 356 and 358 which include the respective opposed inclined portions 360 and 362 defining hopper-like sides at each side of conveyor 66. Oppositely disposed at the top of each sideboard 356 and 358 are the respective brackets 361 (FIG. 1) and 363 (FIG. 3) across which is secured a support angle bar 364 that projects outwardly beyond each sideboard. On the end of bar 364 outside of sideboard 358 and panel 64 a vertically disposed spinner shaft 366 is rotatably supported at its upper end in a bearing 368 secured to bar 364, and to the top of such shaft above bar 364 is secured the pulley wheel 370. The lower end of shaft 366 extends below the bottom plane of panel 64 (FIG. 1) to bearing 372 and carries the dished disk spinner 374 which is provided on its dished surface with a plurality of spaced radially disposed fins 376 that are generally C-shaped in cross section. Bearing 372 is bolted to the outer end of a support frame 378 (FIG. 1) and the inner end of such frame is removably bolted to the rear of wagon frame 16 as at 380. While only a portion of frame 378 is shown in FIG. 1, it will be understood that such frame extends below panels 64 and 62 and is secured similarly to frame 16 as at 380 at the other side of panel 62.

On the end of support bar 364 projecting beyond sideboard 356 and panel 62 there is a dished disk spinner and related parts identical to that just described and accordingly like parts are given like numerals primed. Thus far described, it is pointed out that the spinners 374 and 374' and their respective shafts 366 and 366', together with frame 378, are quickly and easily removable by unbolting bearings 368 and 368' and by unbolting frame 378 at points 380. This involves only removing six bolts, two each on bearings 368 and 368' and one each at points 380 and is a decided advantage in making repairs or replacements or in removing such equipment when not needed.

On the rearwardly end of beam 30 (FIG. 3) forwardly of pulley wheel 370' there is mounted the gear box 382 which connects by a universal joint 384 to the shaft 260 (FIG. 5) and which includes the vertical shaft 386 which carries the pulley wheel 388. Pulley 388 is connected by the endless belt drive 390 to pulleys 370 and 370' as best seen in FIG. 3 and is engaged by an idler pulley 392 attached to bar 364. It will thus be understood that with the engagement of pulley wheel 242 by clutch 250 (FIG. 5) as previously described, the twin spinner disks 374 and 374' are set in operation for distributing material deposited thereon from conveyor 66. The manner of delivering material to the spinners includes some of the novel features of this invention which we shall now describe and for which attention is directed first to FIG. 1.

Opening 68 in the rear wagon wall 38 is provided with a vertically movable gate or door 394 slidable in the respective tracks 396 and 398 at each side of such opening and provides a means for selectively varying the height of the passageway through which material will move on conveyor 66 out of box 34 to the spinner assembly 210. Operation of door 394 is manually by manipulation of handle 400 pivotally secured at one end to a bracket 402 on wall 38 above opening 68 and pivotally secured intermediate its ends as at 404 to one end of a bar 406 that is similarly secured at its other end to door 394. At pivot point 404 a tightening member 408 is provided to hold door 394 in any desired position. On one upper corner of door 394 there is a laterally projecting pointer 410 which moves relative to a set of calibrations 412 affixed to wall 38 that are pre-established for flow rates of materials. This calibration includes two sets of readings 414 and 416 which are relative to the respective driving speeds for the conveyor 66 as permitted by assembly 90 (FIG. 6) previously described. It is also pointed out that in the operation of door 394, tracks 396 and 398 are provided with a plurality of longitudinally spaced openings 418 (FIG. 3) through which any fertilizer or like that may find its way into said tracks can be ejected when the door is moved. This eliminates any binding of the door that would otherwise occur in a closed track of this type.

Referring now to FIGS. 10–12, our novel deflector assembly is indicated generally at 420. This comprises an inclined plate 422 having an upper rolled edge 424 and secured between panels 62 and 64 below the rearward end portion of conveyor 66 as best seen in FIG. 10. The central portion of the upper surface of plate 422 is provided with an inverted V-shaped baffle or deflector 426 that is widest at its forward end 428 and becomes progressively narrow toward end 430. Baffle 426 is disposed on a downwardly and rearwardly sloping incline below the rear end of conveyor 66 and will be intermediate and slightly overlay the closely adjacent perimeters of the spinners 374 and 374' so that material falling onto such baffle will be directed to the perimeter portions of each spinner disk. Superimposed over baffle 426 and secured to plate 422 is a second baffle or deflector 432 which is similar in shape to baffle 426 but larger in size so that its side extremities will extend to a point spaced above the spinner disks 374 and 374' near their axes. Baffle 432 is disposed in spaced relationship above baffle 426 and projects beyond end 428 thereon. On the upper edge of baffle 432 at a point just below the discharge end of conveyor 66 an opening or notch 434 is cut as illustrated in FIG. 11. By this arrangement it is pointed out that as material leaves the discharge end of conveyor 66, part will fall through opening 434 in baffle or deflector 432 onto baffle 426 to be deflected to the perimeter area of the spinner disks 374 and 374' and part will fall onto baffle 432 to be deflected to the axial area of such spinners. In addition, plate 422 serves to deflect material onto the spinner disks that may have clung to the conveyor 66 until past its discharge end and which is carried for a short distance on the lower track of such conveyor. As a result, extensive field tests have demonstrated that a better and more uniform distribution of material is possible than with other type spinner units having only a single deflector means.

To prevent material dispersed by the spinner disks from being thrown against the rear of the trailer and into any of the mechanism thereat, we have mounted a deflector or splashboard 436 (FIG. 1) across frame 378 and forwardly of the spinner disks 374 and 374'. Also, a cover 438 is provided for the several pulleys and belt drive of assembly 210 and this is supported by the bar 440 secured to brackets 362 and 364 as seen in FIG. 3. Bar 440 is provided with an upstanding threaded boss 442 which is engaged by a threaded tightening member 444 on cover 438. Cover 438 is further supported by a pair of depending spaced rods 450 (FIG. 10) which telescope into the respective tubular supports 446 and 448 on the respective sideboards 356 and 358.

*Operation*

It will be understood that the trailer or wagon 14 as described will be hitched to a prime mover such as a tractor (not shown) and for this purpose tongue 56 is supported by jack 60 to facilitate such attachment in a well-known manner as well as to support the frame 16 generally at times as shown in FIG. 2. The power take-off shaft 236 will be connected in a conventional manner to the tractor and the forward free ends of cords 178 and 200 will be suitably disposed adjacent the tractor seat for use as indicated above. On trailer units that are not equipped with a boom unit 214, the auger assembly 212 may be used as a mixing and blending device while the trailer loaded with different materials is being taken to the field, and once in the field, the quick shifting of clutch 250 will transfer driving power from the auger 212 to the spinner assembly 210. At the same time a slight tug or pull on cord 200 will immediately place drive wheel 134 in driving position for the operation of conveyor 66. The speed of conveyor 66 will be determined by means of assembly 90 as described and the location of gate or door 394 in the rear wall 38 of box 34 will depend upon the speed of conveyor 66 and the consistency of material being spread as the operator will be best able to determine. Experience has shown that the spinner disks 374 and 374' are preferably rotated within 650 to 900 r.p.m. although this may be varied and with the construction of assembly 90 and use of the drive wheel 134, conveyor 66 will always deliver the correct amount of material to the spinners irrespective of the ground speed. During the operation of spinner assembly 210, the arrangement and effect of the deflector assembly shown in FIGS. 10–12 distributes the material to both the central or axial and peripheral portions of the spinner disks in a novel manner so as to result in a better and more uniform spreading pattern. To stop conveyor 66 at any time it is only necessary for the operator to pull lightly on cord 178 to completely disengage wheel 134 from contact with the drive wheel 24. This can be done without the operator stopping the tractor or even looking back towards the trailer.

When trailer 14 includes the easily attachable boom unit 214 it can serve the additional purpose of an unloader through stack 296. This requires the engagement of clutch 250 with sprocket 246 which drives all the auger units in boom 214 when shaft 226 is powered but does not drive the auger assembly 212 unless clutch 328 is also engaged with collar 322 on sprocket 320. Thus, when an unloading operation has been completed by the simultaneous operation of auger 212 and boom 214, auger 212 can be quickly disengaged by movement of clutch 328 and the boom 214 can be continued in operation until it is cleared of material. This is deemed to be one of the novel features in the unloading mechanism since it eliminates many of the problems previously mentioned in apparatus of this type where the material moving auger within the wagon and boom augers operate only simultaneously.

The use of the highly efficient, light weight and relatively inexpensive pull type trailer affords many advantages not only to the farmer, but to the commercial fertilizer dealer. For the latter, he can now economically maintain a fleet of such trailers for rental use and for the former, he can now spread his own fertilizer at his own time and to his own satisfaction with a rental trailer. This is not only an important convenience to the farmer from a time standpoint, but also eliminates the capital outlay for a spreader and at the same time, the rental income to the dealer is a highly desirable added source of profit. With this new type trailer, a farmer is no longer hampered by wet seasons as the trailer can be used in any field where a tractor can be driven. It might also be pointed out that in unloading operations, for example, a gasoline engine can be used to drive shaft 226 so a tractor need not be tied up for the sole purpose of using its power take-off.

From the foregoing description it is thought that a full understanding of the construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure of mechanical equivalents which may be reasonably included within their scope.

We claim:
1. In a material handling trailer having a wheeled frame, a material retaining box on said frame, a conveyor mounted within said box for delivering material to a deposit point exteriorly of said box at the rear thereof, and a material distributing assembly operatively associated with said conveyor at said deposit point, the combination therewith of:
a material mixing apparatus within said box,
a first shaft connected to said mixing apparatus and extending exteriorly of the front of said box,
a second shaft connected to said material distributing assembly and extending exteriorly of the front of said box,
a third shaft mounted on said frame at the front of said box and adapted for connection to a source of power,
a first drive means connected to said first shaft and free running on said third shaft,
a second drive means connected to said second shaft and free running on said third shaft, and
a clutch means keyed to said third shaft and selectively engageable with said respective first and second drive means.

2. A trailer as defined in claim 1 including means for driving said conveyor comprising:
a frame member pivotally secured at one end to said frame for vertical swinging movement relative thereto,
a shaft on the other end of said frame member,
a drive wheel on one end of said shaft for peripheral engagement with a trailer wheel,
a drive connection between the other end of said shaft and said conveyor,
control means on said frame operatively connected to said frame member for effecting movement of said drive wheel into and out of engagement with said trailer wheel, and
means for actuating said control means adapted to be accessible at the seat of a tractor to which said trailer will be hitched.

3. A trailer as defined in claim 2 including selectively geared drive connections between said shaft and said conveyor, and clutch means on said shaft for selectively engaging said drive connections.

4. In a material handling trailer having a wheeled frame, a material retaining box on said frame, and a conveyor mounted within said box for delivering material to a deposit point exteriorly of said box at the rear thereof, the combination therewith of:
a pair of dished spinner disks mounted for rotation in a horizontal plane about separate axes in spaced relationship below said deposit point,
means for rotating said disks, and
a baffle assembly intermediate said deposit point and said disks and including a plurality of vertically spaced deflectors, one of which deflectors intercepts material from said deposit point and directs said material onto one area on each disk and another of which deflectors intercepts material from said deposit point and directs said material onto an area of each disk different from said one area.

5. A trailer as defined in claim 4 wherein said baffle assembly includes:
vertically spaced baffle members,
means for supporting said baffle members intermediate said deposit point and said disks,
the uppermost of said baffle member being provided with an aperture, and
said baffle members designed to intercept the fall of material from said conveyor to said disks whereby part of said material is deflected by said uppermost baffle member toward the axes of said disks and part of said material passes through said aperture onto said lowermost baffle member to be deflected toward the perimeter of said disks.

6. A trailer as defined in claim 4 wherein said baffle assembly includes:
a downwardly and rearwardly extending plate,
an inverted V-shaped deflector extending rearwardly from said plate and disposed to deflect material toward the axes of said disks,
said deflector provided with an opening in the apex thereof, and
a second deflector extending from said plate in spaced relationship below said opening and disposed to intercept material passing through said opening and to deflect said material toward the perimeter of said disks.

7. A material handling trailer comprising:
a wheeled frame having a front and read end,
a material retaining box on said frame,
a horizontal auger in said box for moving material toward said front end,
a first shaft mounted on said front end exteriorly of said box and removably connected to said horizontal auger,
a swivelable boom unit on said front end and including a vertically disposed auger for moving material therethrough,
means interconnecting said horizontal and vertical augers for moving material from said box through said boom unit,
a second shaft connected to the auger in said boom unit, and
drive means operatively associated with said first and second shafts whereby said horizontal and vertical augers may be operated simultaneously or said vertical auger may be operated independently of said horizontal auger.

8. A trailer as defined in claim 7 wherein said drive means comprises:
a third shaft mounted on said front end and adapted for connection to a source of power,
a free running drive mount on said first shaft,
a first drive connection secured to said third shaft for operation thereby and to said drive mount,
a second drive connection secured to said second shaft and to said drive mount, and
a clutch means keyed to said first shaft and selectively movable into and out of engagement with said drive mount.

9. A trailer as defined in claim 7 which includes:
a conveyor within said box for delivering material to said rear end exteriorly of said box to a point of deposit,
a pair of dished spinner disks mounted for rotation in a horizontal plane about separate axes in spaced relationship below said deposit point,
means for rotating said disks, and
a baffle assembly intermediate said deposit point and said disks constructed and arranged to deflect part of said material toward the axes of said disks and part toward the perimeters thereof.

10. A trailer as defined in claim 9 wherein said baffle assembly includes a plurality of spaced deflectors each disposed to intercept a portion of the flow of material from said deposit point and to direct it to a different area on said spinner disks.

11. A trailer as defined in claim 9 wherein said baffle assembly comprises:
a downwardly and rearwardly extending plate,
an inverted V-shaped deflector extending rearwardly from said plate and disposed to deflect material toward the axes of said disks,
said deflector provided with an opening in the apex thereof, and
a second deflector extending from said plate in spaced relationship below said opening and disposed to deflect material toward the perimeter of said disks.

12. A material handling trailer comprising:
a wheeled frame having a front and rear end,
a material retaining box on said frame,
a horizontal auger in said box for moving material toward said front end,
a conveyor in said box for moving material to and exteriorly of the rear thereof to a deposit point,
a pair of spinner disks mounted for rotation in a horizontal plane about separate axes below said deposit point,
a first shaft mounted on said front end exteriorly of said box and removably connected to said horizontal auger,
a swivelable boom unit on said front end and including a vertically disposed auger for moving material therethrough,
means interconnecting said horizontal and vertical augers for moving material from said box through said boom unit,
a second shaft connected to the auger in said boom unit,
a third shaft mounted free running on said front end and adapted to be connected to a source of power,
a fourth shaft operably connected at one end to said spinner disks and extending at its other end to said front end exteriorly of said box,
a drive mount free running on said first shaft,
a first drive connection between said drive mount and said third shaft,
a second drive connection between said drive mount and said second shaft,
a third drive connection between said third and fourth shafts,
clutch means keyed to said third shaft and selectively engageable with said first and third drive connections, and
a second clutch means keyed to said first shaft and selectively movable into and out of engagement with said drive mount.

13. A material handling trailer comprising:
a wheeled trailer frame having a front and rear end,
a material retaining box on said frame,
an endless conveyor in said box for moving material to a deposit point exteriorly of said box at said rear end,
a frame member pivotally secured at one end to said frame for vertical swinging movement relative thereto,
a shaft on the other end of said frame member,
a drive wheel on one end of said shaft for peripheral engagement with a trailer wheel,
a drive connection between the other end of said shaft and said conveyor,
control means on said frame operatively connected to said frame member for effecting movement of said drive wheel into and out of engagement with said trailer wheel, and
means for actuating said control means adapted to extend adjacent the seat of a trailer to where said trailer will be hitched,
said control means including:
a plurality of linked levers disposed on said frame forwardly of said frame member so as to be movable forwardly and rearwardly respectively and constructed to effect a toggle joint holding means at each extreme position of movement,
a rigid link connecting one of said levers with the pivotally attached end of said frame member,
separate cords attached respectively to a different one of said levers whereby a manual pull on said respective cords will move said levers in respective opposite directions to selectively raise and lower said frame member, and
said cords adapted to extend to a seat of a tractor to which said trailer will be hitched.

14. A material handling trailer comprising:
a wheeled trailer frame having a front and rear end,
a material retaining box on said frame,
an endless conveyor in said box for moving material to a deposit point exteriorly of said box at said rear end,
a frame member pivotally secured at one end to said frame for vertical swinging movement relative thereto,
a shaft on the other end of said frame member,
a drive wheel on one end of said shaft for peripheral engagement with a trailer wheel,
a drive connection between the other end of said shaft and said conveyor,
control means on said frame operatively connected to said frame member for effecting movement of said drive wheel into and out of engagement with said trailer wheel, and
means for actuating said control means adapted to extend adjacent the seat of a trailer to where said trailer will be hitched,
said control means including:
a bell crank pivotally mounted on said frame forwardly of said frame member,
a rigid link pivotally connected at respective ends with one end of said bell crank and said frame member,
a first cord attached to said end of said bell crank and manually pullable for rocking the same in one direction to correspondingly move said frame member and place said drive wheel in operating position,
lever means pivotally secured respectively to the other end of said bell crank and said frame,
a second cord attached to said lever means and manually pullable to rock said bell crank in the opposite direction to correspondingly move said frame member and place said drive wheel in inoperable position, and
both of said cords adapted to extend to the seat on a tractor to which said trailer will be hitched.

15. A device as defined in claim 14, in which said cords have visually distinguishable characteristics.

16. A device as defined in claim 14 including means for releasably locking said lever means and said bell crank against relative movement.

17. A material handling trailer comprising:
a wheeled frame having a front and rear end,
a material retaining box on said frame,
a horizontal auger in said box for moving material toward said front end,
a swivelable boom unit on said front end and including a vertically disposed auger for moving material therethrough,
means interconnecting said horizontal and vertical augers for moving material from said box through said boom unit,
drive means connected to said horizontal auger and vertical auger and adapted for connection to a source of power, and
means for selectively connecting and disconnecting said horizontal auger to and from said drive means during the operation of said vertical auger.

18. A material handling trailer comprising:
a wheeled frame having a front and rear end,
a material retaining box on said frame,
a horizontal auger in said box for moving material toward said front end,
a conveyor in said box for moving material to and exteriorly of the rear thereof to a deposit point,
a pair of spinner disks mounted for rotation in a horizontal plane about separate axes below said deposit point,
a swivelable boom unit on said front end and including a vertically disposed auger for moving material therethrough, means interconnecting said horizontal and vertical augers for moving material from said box through said boom unit,
a drive means adapted for connection to a source of power,
a first drive connection between said drive means and said vertical auger,
means for selectively connecting said horizontal auger to said first drive means,
a second drive connection between said spinner disks and said drive means, and
clutch means on said drive means separately engageable with said first and second drive connections respectively and selectively disengageable from both of said drive connections.

19. In a material handling trailer having a wheeled frame, a material retaining box on said frame, a conveyor mounted within said box for delivering material to a deposit point exteriorly of said box at the rear thereof, and a material distributing assembly operatively associated with said conveyor at said deposit point, the combination therewith of:
a material mixing apparatus within said box,
a drive means adapted for connection to a source of power,
a first drive connection free running on said drive means and connected to said material mixing apparatus,
a second drive connection free running on said drive means and connected to said material distributing assembly, and
clutch means on said drive means separately engageable with said first and second drive connections respectively and selectively disengageable from both of said drive connections.

20. In a material handling vehicle having a horizontally extending body provided with ends and downwardly converging side walls:
a conveyor mounted on said body between the lower ends of said side walls for movement horizontally of said body,
said conveyor terminating at one end of said body and being adapted to discharge material in said body at said one end,
a pair of horizontally spaced rotatable spinner discs mounted on said body at said one end thereof for receiving and spreading material discharged from said conveyor,
deflector means positioned between said conveyor and said discs for intercepting material discharged from said conveyor,
said deflector means including a pair of vertically spaced baffles each of which is of a substantially inverted V-shape to divide a portion of said material and direct it onto a predetermined portion of each of said spinner disks, one of said baffles directing material onto one portion of each disk and the other one of said baffles directing material onto a different portion of each disk.

References Cited by the Examiner
UNITED STATES PATENTS

| | | | |
|---|---|---|---|
| 2,511,514 | 6/1950 | Rosselot | 275—2 |
| 2,564,494 | 8/1950 | Morrison | 275—8 |
| 2,947,544 | 8/1960 | Hurt | 275—8 |
| 2,970,710 | 2/1961 | Jensen | 275—6 X |
| 3,075,777 | 1/1963 | Conibear | 275—2 |
| 3,085,807 | 4/1963 | Tyler | 275—8 |

ABRAHAM G. STONE, *Primary Examiner.*

T. GRAHAM CRAVER, WILLIAM A. SMITH III,
*Examiners.*